United States Patent Office 3,186,776
Patented June 1, 1965

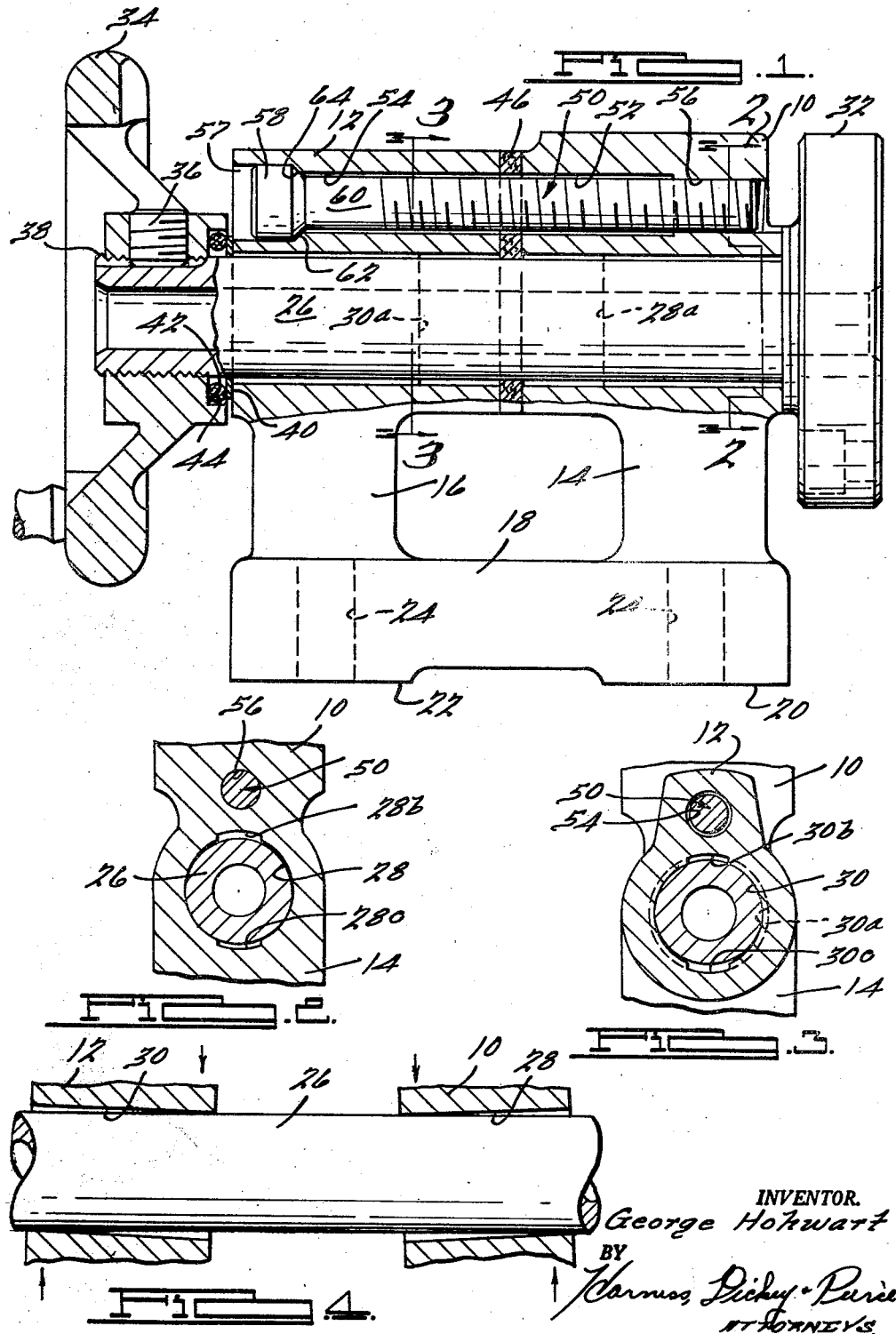

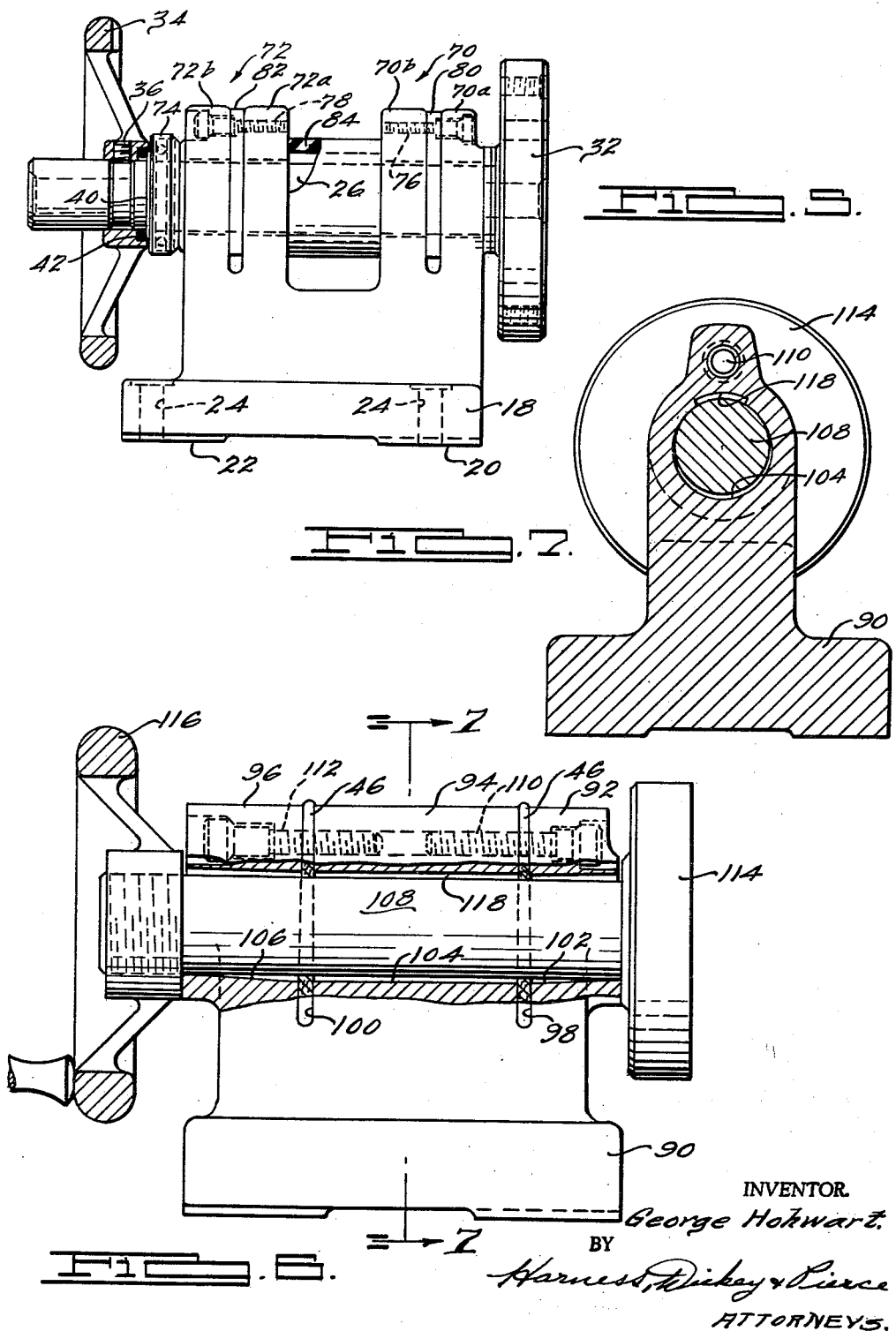

3,186,776
SPINDLE BEARING
George Hohwart, Farmington, Mich., assignor to N. A. Woodworth Company, Ferndale, Mich., a corporation of Michigan
Filed Apr. 16, 1962, Ser. No. 187,848
28 Claims. (Cl. 308—65)

This is a continuation-in-part of my copending application Serial No. 112,639, filed May 25, 1961, now abandoned.

This invention relates broadly to new and useful improvements in bearing structures and more particularly to a bearing structure which provides an essentially close running fit between the bearing wall and the shaft supported thereby, which for all practical purposes eliminates play or runout of the shaft in the bearing, and which is adjustable as required to maintain a proper running fit between the bearing wall and the shaft.

While the bearing structure of this invention has general utility and can be used in any situation where a snug fitting, close running bearing is desired, it is primarily adapted an pre-eminently suited for use in checking fixtures and the like. In checking a workpiece, the latter is detachably fastened in a rotatable chuck, and checking gauges mounted on the fixture in proximity to the chuck are brought into contact with the surface or surfaces of the work to be checked. For example, in measuring out-of-roundness or eccentricity of a peripheral surface, the feeler element of a gauge is brought into engagement with the surface to be checked and the chuck is rotated to turn the workpiece. As the workpiece rotates, variations in roundness or concentricity of the surface can be read directly on the gauge.

Manifestly, the results of a checking operation can never be more accurate than the bearing which supports the chuck, as any looseness or play in this bearing may be reflected on the reading of the gauge. Thus, it is important that the chuck bearing be considerably closer or tighter than the minimum tolerance dimension of the part in order that an accurate reading of the gauge may be obtained. In practice, checking fixtures of the type here under consideration are required to check dimensions to smaller and smaller tolerances and it is increasingly necessary therefore that the chuck bearing have no appreciable or significant play.

An important object of the present invention is to provide a bearing structure in which the shaft is supported so as to be freely rotatable and in such a manner that it has essentially no appreciable or significant wobble, lateral movement or play.

Another object of the invention is to provide a bearing structure of the above-mentioned character that is relatively simple in construction and inexpensive to manufacture.

Still another object of the invention is to provide a bearing structure of the above-mentioned character that is selectively adjustable to remove any play that may exist initially between the shaft and the bearing and to compensate for wear occurring in use.

Yet another object of the invention is to provide a bearing structure of the above-mentioned character that is uniquely adapted to maintain the bearing surfaces at all times to assure free and easy turning of the shaft in the bearing.

Other objects and advantages of the invention will be apparent during the course of the following description.

In the drawing, forming a part of this specification and wherein like numerals are employed to designate like parts throughout the same:

FIGURE 1 is a side view showing parts in elevation and parts in section of a bearing structure embodying the invention and particularly illustrating the bearing structure incorporated in the work-supporting unit of a work checking fixture;

FIG. 2 is a fragmentary, vertical sectional view taken on the line 2—2 of FIGURE 1;

FIG. 3 is a fragmentary, vertical sectional view taken on the line 3—3 of FIGURE 1;

FIG. 4 is a view illustrating diagrammatically the manner in which the shaft is supported in the bearing of this invention;

FIG. 5 is a side view showing parts in elevation and parts in section of a modified form of the invention;

FIG. 6 is a side elevational view showing still another modified form of the invention; and FIG. 7 is a fragmentary vertical sectional view taken on the line 7—7 of FIG. 6.

Referring first to the form of the invention shown in FIGS. 1–4, it will be observed that the outer bearing and supporting structure preferably is in the form of a metal casting having longitudinally spaced, generally aligned front and rear cylindrical bearing sections 10 and 12 supported by integral, laterally extending or depending arm portions 14 and 16 respectively which extend from and are integral parts of a common base 18. Flat bottom surfaces 20 and 22 on the base 18 adapt the latter for mounting on the usual base plate (not shown) of a checking fixture, and holes 24 are provided in the base 18 to receive screws for fastening the latter to the plate. In normal use, the base 18 is positioned horizontally with the arms 14 and 16 extending upwardly therefrom and positioning the bearing sections 10 and 12 in horizontal alignment with each other.

A rotatable shaft 26 extends through and is journaled in substantially aligned bores 28 and 30 in the bearing sections 10 and 12, respectively. The inner or adjacent end portions of the bores 28 and 30 are annularly recessed as at 28a and 30a so as to be spaced circumferentially from the shafts 26 and to restrict the actual contact areas to the outer end portions of the bores. A chuck mounting plate 32 is formed integrally with or fixed in any suitable or conventional manner on the front end of the shaft 26 which projects from the bore 28 forwardly of the front bearing section 10. A hand wheel 34 is mounted on the opposite or rear end of the shaft 26 which projects from the bore 30 rearwardly of the rear bearing section 12. In the form of the invention shown, the hand wheel 34 is threaded on the shaft 26 and is held securely in a selected adjusted position by a set screw 36 which extends into and is received by a slot or way 38 in the shaft. The rearward end of the bore 30 is closed by a washer 40 interposed between the bearing member 12 and the hand wheel 34, and an O-ring 42 disposed in a recess 44 provided in the front face of the hand wheel bears on the washer 40 to maintain an effective seal at this point. The forward end of the front bearing section 10 and the rear face of the chuck mounting plate 32 are carefully finished to provide flat sealing surfaces at the front of the bearing, and the O-ring 42 is compressed sufficiently to hold the mounting plate 32 pressed against the front of the bearing section 10 to maintain an effective seal at this point.

All of the bearing surfaces are lubricated by a felt or porous plastic sealer pad 46 in and filling the space between the bearing sections 10 and 12. In practice, the pad 46 is impregnated with a suitable lubricant and it hugs the shaft 26 so as to release lubricant to the shaft at a controlled rate when the latter is rotated. This lubricant works its way along the shaft 26 and effectively lubricates all of the relatively movable contact or bearing surfaces. Manifestly, the lubricant pad 46 not only maintains a reserve of lubricant for the bearing surfaces but it also closes the inner or adjacent ends of the bearing sections 10 and 12 and keeps out dirt and other foreign matter.

From the foregoing it will be readily apparent that any suitable or conventional chuck can be provided for the chuck mounting plate 32, and the latter can be adapted to accommodate any desired form of chuck. For example, diaphragm chucks, arbor chucks and any of the well-known types of collet chucks can be used. If desired, the shaft 26 can be hollow in form, as shown in the drawing, to accommodate draw bars or other forms of actuators conventionally used with the various types of chucks.

As suggested, the bearing structure of this invention must necessarily provide a close fit between the shaft 26 and the bores 28 and 30 so as to eliminate for all practical purposes all play or lateral motion of the shaft without interfering to any appreciable or significant extent with the free-turning movement of the shaft. According to the present invention, a proper tight fit between the bores 28 and 30 and the shaft 26 is assured by making the bores normally slightly larger in diameter than the shaft 26 to provide a loose running fit therebetween and then drawing the bearing sections 10 and 12 toward each other and axially of the shafts by a suitable interconnecting means such as the screw 50 shown in FIGURE 1.

In the particular form of the invention here shown, the screw 50 connects the two bearing sections 10 and 12 above the bores 28 and 30. As the screw 50 is tightened, it stresses the arms 14 and 16 and tilts the two bores 28 and 30 to the position shown in FIGURE 4. In this connection it will be apparent that the tilted condition of the bores 28 and 30 is exaggerated as shown in FIGURE 4 to illustrate the condition that it obtains and to more clearly set forth the cooperative relationship between the parts. As the screw 50 is tightened, the inner or proximate ends of the bores 28 and 30 are pulled down against the top of the shaft 26 and the outer or distal ends of the bores are drawn upwardly against the underside of the shaft. Manifestly, the amount of the pressure exerted by the walls of the bores 28 and 30 against the shaft 26 can be regulated by selectively adjusting the screw 50. Tightening of the screw 50 increases the pressure and loosening of the screw decreases the pressure. Thus, by selectively adjusting the screw 50 the precise desired degree of resistance to turning of the shaft 26 can be obtained.

Lateral movement or play of the shaft 26 in the bores 28 and 30 is eliminated by providing the bores with upper longitudinal slots 28b and 30b respectively and lower longitudinal slots 28c and 30c respectively. When the base 18 is in its normal horizontal position the upper and lower slots 28b, 30b and 28c, 30c are opposite each other and bisect a vertical plane extending through the centers of the 28 and 30 and the screw 50. These slots 28b, 30b and 28c, 30c to some extent cradle the shaft 26, and when the walls of the bores 28 and 30 are drawn down against the shaft by the screw 50 the shaft engages the bores at laterally spaced points on opposite sides of the slots. In effect, the slots 28b, 30b and 28c, 30c constitute V-blocks which support the shaft 26 both above and below to take out or eliminate all lateral play or movement of the shaft in the bores 28 and 30.

Because of the inclined condition of the bores 28 and 30 due to tightening of the screw 50, pressure against the shaft 26 is concentrated at the ends of the bores. More particularly, pressure against the top of the shaft 26 is concentrated at the inner ends of the bores 28 and 30 and pressure against the underside of the shaft is concentrated at the outer ends of the bores. This is a distinct advantage particularly in the case of the front bearing 10 as it assures a point of maximum support immediately behind the work supporting and chuck mounting plate 32. In this manner, possibility of error being introduced into the gauge reading because of deflection of the shaft 26 or other supporting parts of the work, particularly in the case of small or lightweight fixtures, is substantially eliminated. Also, the instant construction has the advantage that screw 50 can be adjusted when necessary or desirable to regulate the fit between the shaft 26 and the bores 28 and 30 or to compensate for wear of the shaft or of the bores.

In connection with the foregoing, it should perhaps be emphasized that because of the relatively close initial fit between the bores 28 and 30 and the shaft 26 the final contact between the parts is not a line contact. Wear patterns clearly observable in the bores 28 and 30 show that a relatively large area of contact is established between these parts even at the beginning. After a bit, the parts may even wear in so that the areas of contact extend for substantially the entire length of the contact areas of the bores. In the case of a checking fixture, however, where the shaft 26 is turned manually relatively slowly and where use usually is intermittent, very little actual wear occurs, and the initial adjustment of the screw 50 may well suffice for the life of the fixture.

Stresses created in the supporting arms 14 and 16 react against the screw 50 to lock the same securely in the selected adjusted position and eliminates the need for a counterlocking device such as a set screw or the like. Adequate stressing of the arms 14 and 16 is assured by finishing the bores 28 and 30 and the outer end faces of the bearing sections 10 and 12 under tension with the screw 50 in place and tightened approximately one quarter turn. This in effect preloads the arms 14 and 16 when the bores 28 and 30 are in truly aligned or coaxial position. Thus, when the arms 14 and 16 are in a relaxed or unstressed condition, the bores 28 and 30 may actually be inclined slightly in a reverse direction from their final adjusted position. Since the bores 28 and 30 are finished to a size just barely larger than the shaft 26 and since the bores are finished with the arms 14 and 16 under tension, the bearing sections 10 and 12 in a relaxed or unstressed condition of the arms 14 and 16 may and preferably do contact the shaft 26 in a reverse condition to that shown in FIGURE 4. Under these conditions, the inner or proximate ends of the bores 28 and 30 contact the underside of the shaft 26 and the outer or distal ends of the bores contact the top of the shaft. However, when the screw 50 is tightened at assembly, it moves the bores 28 and 30 through a truly aligned position and to the oppositely inclined position shown in FIGURE 4.

Uniform action of the adjusting screw 50 and stressing of the arms 14 and 16 is assured by the screw mounting arrangement now described. As shown in FIGURE 1, the screw 50 extends through aligned holes 52 and 54 in the bearing sections 10 and 12. The front hole 52 is considerably oversize for a major portion of its length extending from the inner or proximate end of hole to an internally threaded section 56 at the outer end of the hole. On the other hand, the rear hole 54 is oversize for its entire length and preferably is of the same diameter as the relatively large unthreaded portion of the front hole 52. Also, it will be observed that the rear hole 54 is counterbored or enlarged as at 57 at the outer end thereof to accommodate the head 58 of the screw 50 which head is larger in diameter than the shank 60. It is significant that the screw 50 is formed at the juncture of the head 58 and shank 60 with a tapered or beveled surface 62 and that the bottom of the counterbore 57 is formed with a correspondingly tapered conical seat 64. By reason of this construction, only the tip end of the screw 50 is threadedly engaged with the hole 52 and the area of threaded engagement is confined to the outer end of the bearing section 10. Similarly, the only contact between the screw 50 and the rear bearing section 12 is on the beveled conical seat 64 which is located adjacent the outer end of the rear bearing section 12. Thus, when the screw 50 is tightened, the opposing forces are anchored adjacent the outer ends of the bearing sections 10 and 12 without any interference in between. The conical seat 64 for the adjusting screw 50 aligns the two ends of the bearing sections 10 and 12 across the slot therebetween and keeps them perfectly aligned during and between adjustments. A progressive uniform action of the screw is thus obtained and a sensitive adjustment is assured at all times.

In situations requiring an extremely close bearing fit, it may be desirable to provide a double bearing mounting for the shaft 26 as shown in FIGURE 5. This construction is otherwise substantially identical to the first form of the invention, and corresponding numerals therefore are employed to designate corresponding parts of the bearing structure. Only the novel structure and features are described in detail.

More particularly, the device of FIGURE 5 is similar to the first form of the invention except that it has separate front and rear bearing mountings 70 and 72 at longitudinally spaced points along the shaft 26 and a thrust bearing 74 is interposed between the rear bearing mounting 72 and the washer 40 which comprises and receives the reaction force of the O-ring 42. The two-bearing arrangement supports the shaft 26 with substantially no appreciable or significant lateral motion, wobble or play, and the thrust bearing 74 reduces friction due to end pressure caused by the O-ring 42.

As shown, the front bearing mounting 70 comprises separate bearing sections 70a and 70b which together correspond to the bearing sections 10 and 12 in the first form of the invention. An adjusting screw 76 connects the bearing sections 70a and 70b and it preferably functions in the same manner as the screw 50 in the form of the invention first described. The rear bearing 72 similarly comprises separate bearing sections 72a and 72b and the latter are similarly connected by an adjusting screw 78. Lubricant impregnated pads 80 and 82 of sponge rubber or plastic material are disposed between the respective sections of the front and rear bearings 70 and 72 to supply lubricant at a controlled rate to the shaft 26. A rubber sleeve 84 surrounding the shaft 26 between the front bearing 70 and the rear bearing 72 and abutting endwise thereagainst seals the shaft 26 and prevents dirt or the like from penetrating the bearings around the shaft.

In use, the two adjusting screws 76 and 78 can be tightened independently and selectively to flex the front bearing sections 70a and 70b and the rear bearing sections 72a and 72b respectively against the shaft 26. By spacing the two bearings 70 and 72 along the length of the shaft 26 in the manner shown, maximum control of the shaft is assured and a balanced bearing pressure is obtained. In fact, tests have shown that play on the shaft 26 can be reduced to a few millionths of an inch by properly spacing and adjusting the two bearing mountings 70 and 72. As suggested, the thrust bearing 74 reduces friction due to end pressure and makes the shaft 26 easier to turn.

FIGS. 6 and 7 show still another modified form of the invention having a suitable base 90 and front, intermediate and rear bearing sections 92, 94 and 96. If desired, the base 90 and the bearing portion can be cast as one piece and the individual bearing sections 92, 94 and 96 then formed by cutting the bearing portion of the casting transversely at 98 and 100. Aligned holes 102, 104 and 106 are provided in the bearing sections 92, 94 and 96 respectively, and a shaft 108 extends through and is journaled for rotation in the holes. As shown, the cuts 98 and 100 extend substantially below the holes 102, 104, 106 so that the front and rear bearing sections 92 and 96 can be flexed axially of the shaft 108 and relative to the middle bearing section 94 which is relatively rigid. To this end an adjusting screw 110 connects the front bearing section 92 to the intermediate bearing section 94 above the holes 102 and 104 and an adjusting screw 112 connects the rear bearing section 96 to the intermediate bearing section 94 above the holes 106 and 104. If desired, the adjusting screws 108 and 110 can be formed, mounted and arranged similarly to the adjusting screw 50 in the first form of the invention so as to assure a smooth uniform flexure of the outer bearing sections 92 and 96. A suitable mounting plate 114 is shown on the forward end of the shaft 108 and a handwheel 116 on the rearward end thereof.

In this form of the invention all of the holes 102, 104 and 106 are slightly oversized with respect to the shaft 108 so that an essentially loose running fit normally obtains therebetween. However, when the adjusting screws 110 and 112 are tightened, the two end bearing sections 92 and 96 are pulled or flexed toward the intermediate bearing section 94 to tilt the end holes 102 and 106 relative to the axis of the shaft 108. As the end bearing sections 92 and 96 are flexed in this manner, the outer ends of the holes 102 and 106 are pulled into snug bearing engagement with the underside of the shaft 108 and the top side of the shaft is lifted into snug bearing engagement with the top of the hole 104. Under these conditions, the shaft 108 is confined at the top by the hole 104 and at the bottom and at opposite ends of the hole 104 by holes 102 and 106, and the amount of pressure exerted by the walls of the holes against the shaft can be easily regulated by tightening or loosening the screws 110 and 112. When the screws 110 and 112 are properly adjusted, the exact running fit desired is obtained between the shaft 108 and the bearing holes 102, 104 and 106 and the shaft is held with the precise amount of bearing pressure required to minimize play between the shaft and the bearings. Also, the screws 110 and 112 can be adjusted from time to time as required to compensate for wear or other factors causing a loosening or other change in the operation of the shaft 108. Manifestly, the bearing arrangement shown provides support for the mounting plate 114 and a check or other appurtenance fastened thereto at the underside of the shaft 108 and immediately behind the plate 112 to assure maximum support therefor.

In connection with the foregoing it should perhaps be pointed out here that the clearances between the shaft 108 and the walls of the holes 102, 104 and 106 are exaggerated in the drawing to illustrate the principle involved. In practice, these clearances are small.

A longitudinal groove 118 is provided at the top of the hole 104, as shown in FIGURE 7, to hold the shaft 108 against lateral movement in the bearing. In practice, however, the groove 118 may extend through all three holes 102, 104 and 106 as it is formed most easily by a broaching operation. The portions of the groove in the end holes 102 and 106 serve no useful purpose in use, however, as the upper portions of these holes may be free of engagement with the shaft in the final flexed condition of the bearing sections 92 and 96. Also, if desired or if maximum lateral confinement of the shaft is necessary, grooves can be provided at both the top and the bottom of holes, as in the form of the invention first described. Here again, if both upper and lower grooves are used, the lower groove need be formed only in the two outer bearing sections 92 and 96, as the lower portion of the intermediate hole 104 may not contact the shaft in the final flexed position of the bearing sections; however, if the lower slot is formed by a broaching operation, it may be extended through all three holes 102, 104, 106 without ill effect. In any event, the groove or grooves 118, as the case may be, are formed on a vertical diameter of the holes 102, 104 and 106 so that the sides of the grooves contact the shaft 108 on opposite sides of a vertical plane through the axis of the shaft. When this condition and relationship between the parts obtains, the grooves cradle the shaft 108 and the hold the same securely against lateral movement in the bearing.

When the screws 110 and 112 are properly adjusted, the shaft 108 is held firmly without appreciable or significant wobble, lateral movement or play but is freely rotatable, and it will be readily apparent that the screws 110 and 112 are selectively, individually adjustable to remove any play that may exist initially between the shaft and the bearings and to compensate for wear occurring in use.

Having thus described the invention, I claim:

1. A bearing comprising a plurality of spaced bearing sections having generally aligned bores, a base, flexible support means for at least certain of said bearing sections connecting the latter to said base, a movable shaft in said bores, and adjustable means for flexing said certain bearing sections lengthwise of the shaft to incline the axes of the bores in said flexed sections relative to the axis of said shaft and to bring the ends of said bores against and rotatably confine said shaft.

2. A bearing comprising a plurality of spaced bearing sections having generally aligned bores, a base, flexible support means for at least certain of said bearing sections connecting the latter to said base, a movable shaft in said bores, means in said bores engaging said shaft to hold the same against lateral movement, and adjustable means for flexing said certain bearing sections lengthwise of the shaft to incline the axes of the bores in said flexed sections relative to the axis of said shaft and to bring the ends of said bores against and rotatably confine said shaft.

3. The bearing as set forth in claim 2 wherein said means comprises a longitudinal groove in said bores receiving and cradling said shaft.

4. A bearing comprising a plurality of spaced bearing sections having generally aligned bores at least certain of which have discrete bearing surfaces spaced laterally at opposite sides of the longitudinal axis of said bores, a movable shaft in said bores, and means for flexing at least certain of said bearing sections lengthwise of the shaft and in a plane through the axis of the shaft and bisecting said bearing surfaces, the axes of the bores in said flexed sections being inclined with respect to the axis of the shaft and the shaft being rotatably confined and supported on opposite sides thereof by said discrete bearing surfaces and the surfaces of said bores opposite said discrete bearing surfaces.

5. A bearing comprising spaced bearing sections having aligned bores, a mounting base, means supporting said bearing sections, on said mounting base, a movable shaft in and extending through said bores, means for flexing said bearing sections and said support means lengthwise of said shaft to hold the end portions of said bores against said shaft with the latter bearing against and rotatably supported by said end portions, and means in at least certain of said bores engaging said shaft to prevent lateral movement thereof in said bores when said shaft is rotatably supported by the end portions of said bores.

6. A bearing comprising spaced bearing sections having generally aligned bores provided with longitudinal grooves, a mounting base, support means connecting said bearing sections to said mounting base, a movable shaft extending through and journaled in said bores, and means flexing said bearing sections and their supports lengthwise of said shaft holding the end portions of said bores against opposite sides of said shaft with the latter bearing against and supported by said end portions on opposite sides of said grooves.

7. A bearing comprising a base having laterally spaced upstanding arm portions provided with bearing sections having generally aligned bores therein, a rotatable shaft journaled in said bores, cradling means in said bores engaging said shaft and holding the same against lateral movement or play in said bores, and an adjustable tension screw extending between and interconnecting said bearing sections, said bores in the normal relaxed or unstressed condition of said arm portions being inclined from a truly aligned position and having the inner end portions thereof contacting the underside of said shaft and the outer end portions thereof contacting the upper side of said shaft, said tension screw adapted to be tightened to pull said bearing sections toward each other so as to preload or stress said arm portions and to move said bores through a truly aligned position to an oppositely inclined position in which the inner end portions of the bores contact the upper side of the shaft and the outer end portions thereof contact and support the lower side of said shaft, stresses thus created in said arm portions holding said tension screw in the selected adjusted position, and said cradling means engaging said shaft to prevent lateral movement or play thereof in said bores.

8. The combination of spaced bearing sections on essentially stiff flexible supports, said sections provided with generally aligned bores having opposed longitudinal slots, a rotatable shaft journaled in said bores, and means flexing said bearing sections and their supports lengthwise of said shaft holding the end portions of each bore against opposite sides of said shaft with the shaft bearing against and supported by said end portions on opposite sides of said slots.

9. The combination of spaced bearing sections carried by essentially stiff but flexible supports, said sections provided with generally aligned bores at least certain of which have longitudinal slots, a movable shaft extending through and journaled in said bores, and adjustable means for moving said bearing sections relative to each other axially of said shaft to stress said supports, said adjustable means holding the end portions of said bores against the sides of said shaft with the shaft supported at opposite sides of said slots.

10. The combination as set forth in claim 9 wherein said adjustable means is a screw extending through aligned holes in said bearing sections, and wherein said screw engages and is interconnected with said holes only adjacent the outer ends of said bearing sections.

11. The combination as set forth in claim 9 wherein said adjustable means has spaced anchor points located adjacent the outer ends of said bearing sections, and wherein said adjustable means is without interference between said anchor points.

12. The combination as set forth in claim 9 wherein said adjustable means is a screw disposed in aligned holes in said bearing sections, said screw having a head portion provided with a beveled inner face seating on a correspondingly beveled annular seat adjacent the outer end of one of said holes, said screw also having a threaded shank portion engaging an internally threaded portion of the other of said holes located at the outer portion only of said other hole, both said one hole and said other hole being relieved and spaced circumferentially from said screw between said seat and said internally threaded portion.

13. The combination of spaced bearing sections connected to a common base by separate elongate and flexible but essentially stiff arm portions, said bearing sections being provided with generally aligned bores having longitudinal slots, a rotatable shaft journaled in said bores, and means for stressing said arm portions to incline said bores slightly from alignment with each other so as to engage the ends of each bore with opposite sides of said shaft, said shaft contacting said bores on opposite sides of said slots and the latter being disposed to stabilize the shaft in the bores and prevent wobble or lateral motion of the shaft in the bores during rotation of said shaft.

14. The combination of spaced bearing sections connected to a common base by separate elongate and flexible but essentially stiff arm portions, said bearing sections being provided with generally aligned bores having opposed longitudinal slots, a rotatable shaft journaled in said bores, and means for drawing said bearing sections toward each other to stress said arm portions, said means adapted to hold the ends of each bore against opposite sides of said shaft with the latter containing said end portions on opposite sides of said slots.

15. The combination of spaced horizontal bearing sections having fixed depending supporting arms, said bearing sections being provided with generally aligned bores having the axes thereof normally inclined slightly each with respect to the other and each having at least one longitudinal slot on a vertical diameter thereof, a rotatable shaft journaled in said bores, and means interconnecting said bearing sections adapted to stress the same in a direction to incline the axes thereof oppositely to their normal inclined position preload or stress said supporting arms and to hold the end portions of each bore against opposite sides of said shaft with the latter contacting said end portions on opposite sides of said slots.

16. The combination of spaced horizontal bearing sections having fixed depending supporting arms, said bearing sections being provided with generally aligned bores having upper and lower longitudinal slots, a rotatable shaft journaled in said bores, and means interconnecting said bearing sections drawing the latter toward each other to preload or stress said supporting arms holding the end portions of each bore against opposite sides of said shaft with the shaft contacting said end portions on opposite sides of said slots.

17. The combination of spaced bearing sections carried by laterally extending arm portions each fixed at the distal end thereof to a suitable mounting base, said bearing sections having generally aligned bores provided with longitudinal slots, a rotatable shaft journaled in said bores, and adjustable means for moving said bearing sections relative to each other to selectively preload or stress said arm portions, said bearing sections being normally positioned with the arm portions in an unstressed or relaxed condition with said bores inclined slightly from a common axis so that the inner end portions of the bores contact the shaft on one side thereof and the outer end portions of the bores contact the shaft on the opposite side thereof, said adjustable means adapted to draw said bearing sections toward each other through a position in which the axes of said bores are coincident to said common axis and to an oppositely inclined position wherein the areas of contact between the end portions of the bores and said shaft are reversed and said arm portions are stressed to lock said tensioning means in a selected adjusted position.

18. The combination of spaced horizontal bearing sections supported on a common base by upstanding arm portions and provided with generally aligned bores having upper and lower longitudinal slots, a rotatable shaft journaled in said bores, and adjustable means for drawing said bearing sections toward each other, said bores being normally inclined slightly from the horizontal when said arm portions are in a free or relaxed condition with the inner end portions thereof contacting the underside of said shaft and the outer end potrions thereof contacting the upper side of said shaft, said adjustable means being operable to draw said bearing sections toward each other to stress or preload said arm portions and to move said bores through a truly aligned position and into an oppositely inclined position wherein the inner end portions of said bores contact the upper side of said shaft and the outer end portions of said bores contact the lower side of said shaft, in the last mentioned position of said bores said shaft being cradled in said slots and contacting said bores on opposite sides of said slots to prevent relative lateral motion or wobble of said shaft in said bores.

19. A checking fixture comprising a base having laterally spaced upstanding arm portions provided at the upper ends thereof with generally aligned horizontal bearing sections, having generally aligned bores provided with upper and lower longitudinal slots, a rotatable shaft journaled in said bores, and an adjustable tension screw extending between and interconnecting said bearing sections, in the normal relaxed or unstressed condition of said arm portions said bores being inclined slightly from a truly aligned position with the inner end portions thereof contacting the underside of said shaft and the outer end portions thereof contacting the upper side of said shaft, said tension screw adapted to be tightened to pull said bearing sections toward each other so as to preload or stress said arm portions and to move said bores through a truly aligned position to an oppositely inclined position in which the inner end portions of the bores contact the upper side of said shaft and the outer end portions thereof contact and support the lower side of said shaft, stresses thus created in said arm portions holding said tension screw in the selected adjusted position and said shaft being cradled in said slots and contacting said bores on opposite sides of said slots to assure a close running fit between the shaft and the bores and to prevent lateral movement or play of the shaft in the bores.

20. The combination of spaced bearing sections carried by essentially stiff but flexible supports, said sections provided with generally aligned bores relieved annularly at the inner ends having annular bearing portions at the outer ends thereof and longitudinal slots in and extending through at least said bearing portions, a rotatable shaft extending through and journaled in said bores supported at the outer end portions only of said bores by said bearing portions, and adjustable means for moving said bearing sections relative to each other axially of said shaft to stress said supports, said adjustable means holding the end portions of each bore in engagement with opposite sides of said shaft with the latter bearing against said bores on opposite sides of said slots.

21. The combination of in-line bearing sections carried by essentially stiff, flexible and resilient supports and arranged with the inner or proximate ends therefor spaced slightly apart, said sections provided with generally aligned bores having longitudinal slots, a rotatable shaft extending through and journaled in said bores, a porous, lubricant impregnated sealing member in and confined between the proximate ends of said bearing section surrounding and closely fitting said shaft, and adjustable means for moving said bearing sections relative to each other axially of said shaft to stress said supports, said adjustable means holding the end portions of each bore against opposite sides of said shaft with the latter bearing against said bores on opposite sides of said slots.

22. A bearing structure comprising a base, spaced intermediate and end bearing sections on said base having generally aligned bores therein, flexible support means for said end bearing sections, a movable shaft extending through and journaled in said bores, and means for flexing said end bearing sections and their supports lengthwise of said shaft holding the walls of the bores in said ends sections against said shaft and the latter pressed with predetermined force against the wall of the bore in said intermediate bearing section.

23. The combination as set forth in claim 22 including means in at least certain of said bores engaging and cradling said shaft to restrict lateral movement thereof.

24. The combination as set forth in claim 23 wherein said shaft engaging means bear on said shaft at opposite sides thereof.

25. The combination as set forth in claim 22 including longitudinal slots in the bores of at least certain of said bearing sections arranged to cradle said shaft and providing laterally spaced discreet bearing surfaces engaging said shaft at opposite sides thereof to confine the same and to restrict lateral movement thereof in said bores.

26. A bearing comprising spaced pairs of bearing sections having generally aligned bores therein, a mounting base at one side and spaced from said bearing sections, flexible supports connecting said mounting base to said bearings sections, a movable shaft extending through and journaled in said bores, and adjustable means for flexing the bearing sections of each pair and their supports lengthwise of said shaft to tilt the axis of said bores relative to the axis of said shaft and to hold the end portions of said bores against opposite sides of said shaft.

27. The combination as set forth in claim 26 including means in at least certain of said bores engaging said shaft to restrict lateral motion thereof in said bores.

28. The combination as set forth in claim 26 wherein at least certain of said bores have longitudinal slots which receive and cradle said shaft and provide laterally spaced discreet bearing surfaces engageable with the shaft on opposite sides thereof to confine the same and to restrict lateral movement thereof in said bores.

References Cited by the Examiner

UNITED STATES PATENTS 705,674  7/02  Jay _____ 308—69

FOREIGN PATENTS 473,202  9/14  France.
393,662  4/24  Germany.
9,058  1889  Great Britain.

ROBERT C. RIORDON, *Primary Examiner.*

FRANK SUSKO, *Examiner.*